(12) United States Patent
Rhodes

(10) Patent No.: US 9,997,779 B2
(45) Date of Patent: Jun. 12, 2018

(54) ANODE ACTIVE MATERIAL FOR LITHIUM-ION BATTERIES

(71) Applicant: FORD GLOBAL TECHNOLOGIES, LLC, Dearborn, MI (US)

(72) Inventor: Kevin James Rhodes, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 104 days.

(21) Appl. No.: 14/972,574

(22) Filed: Dec. 17, 2015

(65) Prior Publication Data

US 2016/0104887 A1   Apr. 14, 2016

Related U.S. Application Data

(62) Division of application No. 13/954,246, filed on Jul. 30, 2013, now Pat. No. 9,240,588.

(51) Int. Cl.

| | |
|---|---|
| *H01M 4/485* | (2010.01) |
| *H01M 4/36* | (2006.01) |
| *H01M 4/505* | (2010.01) |
| *H01M 4/525* | (2010.01) |
| *C01F 5/02* | (2006.01) |
| *C01G 49/00* | (2006.01) |

(Continued)

(52) U.S. Cl.
CPC ............. *H01M 4/485* (2013.01); *C01F 5/02* (2013.01); *C01G 30/005* (2013.01); *C01G 30/02* (2013.01); *C01G 30/023* (2013.01); *C01G 45/12* (2013.01); *C01G 49/0018* (2013.01); *C01G 51/00* (2013.01); *C01G 51/40* (2013.01); *C01G 53/00* (2013.01); *C01G 53/40* (2013.01); *H01M 4/364* (2013.01); *H01M 4/505* (2013.01); *H01M 4/525* (2013.01); *H01M 10/0525* (2013.01); *C01P 2002/72* (2013.01); *C01P 2006/80* (2013.01); *H01M 4/62* (2013.01); *H01M 2004/027* (2013.01)

(58) Field of Classification Search
CPC ................................ C01G 30/23; C01G 30/26
See application file for complete search history.

(56) References Cited

U.S. PATENT DOCUMENTS

| | | |
|---|---|---|
| 2011/0001094 A1 | 1/2011 | Hashiba et al. |
| 2012/0125154 A1 | 5/2012 | Manthiram et al. |

OTHER PUBLICATIONS de Laune et al. ("Structural and magnetic characterisation of CoSb2O4, and the substitution of Pb2+ for Sb3+" Journal of Solid State Chemistry, 187, (2012), 225-230).*

(Continued)

*Primary Examiner* — Peter F Godenschwager
(74) *Attorney, Agent, or Firm* — James Dottavio; Brooks Kushman P.C.

(57) ABSTRACT

In at least one embodiment, a rechargeable battery is provided comprising an anode having an active material including $MSb_2O_4$ having a purity level of greater than 93 percent by weight, wherein M is a metal. The metal may have an oxidation state of 2+ and may include transition metals and/or alkali-earth metals. The anode active material may be synthesized using metal acetates or metal oxides. The synthesis may include heating at a first temperature to remove oxygen and water and reacting at a second temperature to form the $MSb_2O_4$ structure, which may be a spinel crystal structure.

19 Claims, 3 Drawing Sheets

(51) Int. Cl.
 C01G 30/02 (2006.01)
 C01G 51/00 (2006.01)
 C01G 53/00 (2006.01)
 C01G 30/00 (2006.01)
 C01G 45/12 (2006.01)
 H01M 10/0525 (2010.01)
 H01M 4/02 (2006.01)
 H01M 4/62 (2006.01)

(56) References Cited

OTHER PUBLICATIONS

Swaminathan et al. ("High temperature stabilities of interoxides in the system Fe—Sb—O and their comparison with the interoxides in other M—Sb—O (M = Cr, Ni or Co) systems" Journal of Alloys and Compounds, 358 (2003) 48-55).*

Chater et al. ("Thermodynamic studies on antimonites MSb2O4 (M = Ni,Fe) in the temperature range 10 to 300 K" Materials Research Bulletin, vol. 21, pp. 703-708).*

Santos Pena, J. et al., "Reaction of SbPO4 with lithium in non-aqueous electrochemical cells: preliminary study and evaluation of its electrochemical performance in anodes for lithium ion batteries", Journal of Solid State Chemistry, Apr. 28, 2004, pp. 2920-2927, vol. 177.

Anji, R.M. et al., "NbSb2 as an anode material for Li-ion batteries", Journal of power sources, 2006, abstract, vol. 159.

Yoon, S. et al., "Sb—MOx—C (M = Al, Ti, or Mo) Nanocomposite Anodes for Lithium-Ion Batteries", Chemistry of Materials, Jul. 29, 2009, abstract, vol. 21, Issue 16.

Jibin, A.K. et al., "Pb3O4 type antimony oxides MSb2O4 (M = Co, Ni) as anode for Li-ion batteries", Electrochimica Acta, Apr. 4, 2012, pp. 227-232, vol. 71.

Santos Pena, J. et al., "A New Electrode Based in Antimony Oxide For Lithium Ion Batteries", http://www.electrochem.org/dl/ma/203/pdfs/1123.pdf, downloaded on Jul. 30, 2013, 1 page.

* cited by examiner

ANODE ACTIVE MATERIAL FOR LITHIUM-ION BATTERIES

CROSS-REFERENCE TO RELATED APPLICATIONS

This application is a division of U.S. application Ser. No. 13/954,246 filed Jul. 30, 2013, the disclosure of which is hereby incorporated in its entirety by reference herein.

TECHNICAL FIELD

One or more embodiments related to an anode active material including $MSb_2O_4$ for lithium-ion batteries.

BACKGROUND

Enhancement of battery performance is an important issue in the advancement of portable electronics, power grid regulation, and electrified vehicles. Rechargeable or secondary batteries generally include positive and negative electrodes, a separator, and an electrolyte. Current collectors are typically attached to each electrode in order to extract current from the battery. In lithium-ion batteries (LIBs), the negative electrode (anode) often includes graphitic carbon, which has a capacity of about 375 mAh/g. Graphitic carbon has a low discharge voltage of about 20 mV, which provides a large voltage difference between itself and the positive electrode (cathode), and therefore a relatively high power density. However, the low voltage may lead to lithium plating and large amounts of solid electrolyte interphase (SEI) formation.

SUMMARY

In at least one embodiment, a rechargeable battery is provided comprising an anode having an active material including $MSb_2O_4$ having a purity level of greater than 93 percent by weight, wherein M is a metal. In one embodiment, M has an oxidation state of 2+ and may include zinc (Zn), iron (Fe), manganese (Mg) and magnesium (Mn), cobalt (Co) or Nickel (Ni). The active material may include at least 95 or 97 weight percent $MSb_2O_4$. In one embodiment, the active material has a discharge voltage of 0.1 to 1.0 V. In another embodiment, the active material has a capacity of at least 250 mAh/g. The anode may further include M and $Li_2O$ formed as an inactive matrix. In one embodiment, the active material has a spinel crystal structure. M may include $M1_xM2_y$, M1 being different from M2, M1 and M2 each having an oxidation state of 2+, and x and y summing to 1.

In at least one embodiment, a method of forming an anode active material is provided comprising mixing stoichiometric ratios of a metal oxide MO, M having an oxidation state of 2+, and an antimony oxide, heating the mixture to a first temperature to remove oxygen and water from the mixture, and reacting the mixture at a second temperature to form $MSb_2O_4$. M may be one of zinc (Zn), iron (Fe), manganese (Mg), magnesium (Mn), nickel (Ni), and cobalt (Co). In one embodiment, the mixture is reacted to form $MSb_2O_4$ with a purity of at least 95 percent by weight. The second temperature may be from 450° C. to 650° C. and the mixture may be held at the second temperature for a period of 5 to 25 hours. The mixing step may include ball milling the MO and antimony oxide to form an intermixed powder. In one embodiment, the heating and reacting steps are done in an inert gas atmosphere.

In at least one embodiment, a method of forming an anode active material is provided comprising mixing stoichiometric ratios of a metal M acetate or acetate hydrate, M having an oxidation state of 2+ and being one of zinc (Zn), iron (Fe), manganese (Mg) and magnesium (Mn), and an antimony oxide, heating the mixture to a first temperature to remove oxygen and water from the mixture, and reacting the mixture at a second temperature to form $MSb_2O_4$.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
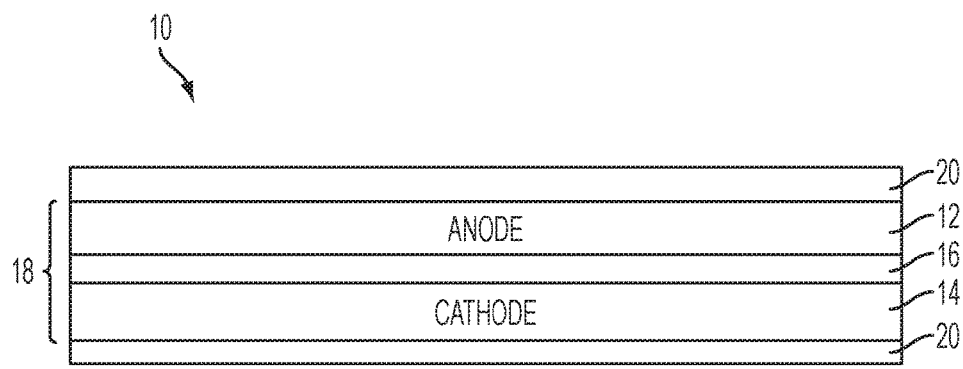
FIG. 1 is a schematic cross-sectional view of a lithium-ion battery.

With reference to FIG. 1, a cross-section of a typical battery 10 is shown, which may be a rechargeable battery (e.g., a lithium-ion battery). The battery 10 includes a negative electrode (anode) 12, a positive electrode (cathode) 14, a separator 16, and an electrolyte 18 disposed within the electrodes 12, 14 and separator 16. However, the battery 10 may include additional components or may not require all the components shown, depending on the battery type or configuration. In addition, a current collector 20 may be disposed on one or both of the anode 12 and cathode 14. The current collector 20 may be formed of any suitable material. For example, the current collector 20 for the anode 12 may be copper and the current collector 20 for the cathode 14 may be aluminum.

Improvements in electrode active materials may be one approach to meet the increasing demand for higher energy density storage devices. An improved electrode active material may have a discharge voltage plateau that is higher than graphitic carbon but not so high as to cause a significant loss of power density in the cell. The electrode active material may also have good resistance to physical degradation and a high specific capacity.

Figure 2:
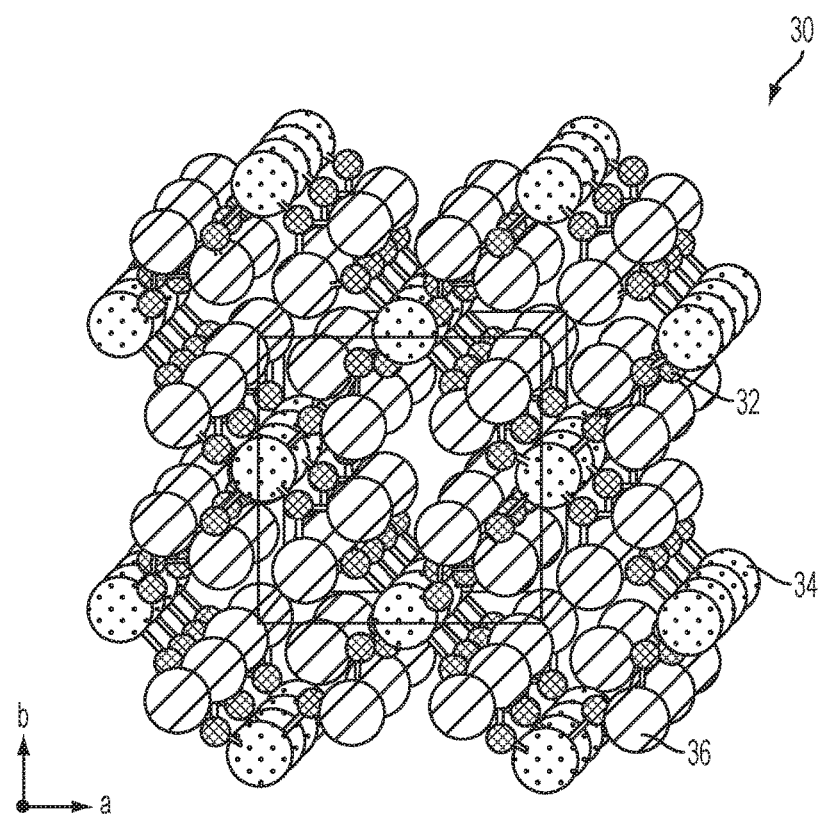
FIG. 2 is a schematic representation of an anode active material according to an embodiment.

With reference to FIG. 2, an anode active material 30 for use in LIBs is shown having a formula of $MSb_2O_4$, wherein Sb is antimony, O is oxygen, and M is a metal capable of a 2+ oxidation state, for example, a transition metal or an alkali-earth metal. In at least one embodiment, M is zinc (Zn), iron (Fe), Manganese (Mn) or magnesium (Mg). Elements such as cobalt (Co) and nickel (Ni) may also be used, but they are relatively expensive and heavy elements and therefore may not be as advantageous as Zn, Fe, Mn and Mg. In any of the described embodiments above or below, M may include $M1_xM2_y$, wherein M1 and M2 are different and x and y sum to 1. M1 and M2 may be any of the elements described as suitable for the metal M. Similarly, M may include 3, 4, 5, or more combinations of metals, M, for example, $M1_xM2_yM3_z$, with x, y, and z summing to 1.

Conventional Li-ion battery electrodes operate by intercalation of lithium ions, wherein the lithium ions are extracted from the anode and migrate to the cathode during discharge and are extracted from the cathode and migrate to the anode during charging. However, the $MSb_2O_4$ anode does not operate by intercalation, but rather is a conversion electrode. The $MSb_2O_4$ anode active material 30 may be crystalline and have a crystal structure. In one embodiment, shown in FIG. 2, the crystal structure is a spinel crystal structure, with the oxide anions 32 arranged in a cubic close-packed lattice and the M and Sb cations 34, 36 occupying some or all of the octahedral and tetrahedral sites in the lattice. During an initial discharge, the $MSb_2O_4$ crystal structure is destroyed and the metal M, $Li_2O$, and $Li_xSb$ are formed (wherein x may be 2 or 3). During charging, de-alloying of the $Li_3Sb$ occurs. The metal M and $Li_2O$ formed during the initial discharge operate as an inactive matrix, which buffers the volume variations that occur during the alloying-de-alloying reactions that take place during cycling of the battery. Without the buffering of the inactive matrix, the repeated volume variations over time can disrupt the LIB and reduce performance and battery life.

In addition to the anode active material 30, the anode 12 may further include a conductive material and/or a binder. An example of a suitable conductive material may be a conductive carbon, such as amorphous carbon. However, any suitable conductive material may be included. The binder may be a non-water soluble binder, such as poly(vinylidine difluoride) (PVDF), or it may be a water soluble binder, such as carboxymethyl cellulose (CMC), Xantham gum, or polyvinyl alcohol (PVA). If the electrode including the anode active material 30 is formed using a slurry casting, then the conductive material and binder may be included. However, the anode active material 30 may also be deposited as a thin film and therefore not require a binder or conductive material, for example, if included in a solid state battery.

The $MSb_2O_4$ anode active material may be synthesized in several ways. In at least a first embodiment, the $MSb_2O_4$ anode active material is synthesized by mixing stoichiometric ratios of a metal acetate and/or metal acetate hydrate of Zn, Fe, Mn, or Mg (e.g., $Zn(CH_2CO_2)_2$) and an antimony oxide and heating the mixture in an atmosphere of an inert gas, for example, argon. In one embodiment, the antimony oxide is $Sb_2O_3$. The metal acetate/acetate hydrate and the antimony oxide may be in the form of a powder, and may be mixed in any suitable manner, such as ball milling. The powder may be pressed into a pellet to increase contact between the components in the mixture. The mixture may be heated at a first, lower temperature to remove oxygen and water from the powder mixture. In one embodiment, the first temperature is from 100 to 200° C. In another embodiment, the first temperature is from 125 to 175° C. In another embodiment, the first temperature is about 150° C. However, any suitable temperature for removing oxygen and water from the mixture may be used. The mixture may be held at the first temperature for a time sufficient to remove substantially all oxygen and water from the mixture. In one embodiment, the mixture is held at the first temperature for 10 minutes to 2 hours. In another embodiment, the mixture is held at the first temperature for 30 minutes to 1.5 hours. In another embodiment, the mixture is held at the first temperature for about 1 hour. The heating at the first temperature may be done under an inert gas flow, for example, argon.

After substantially all of the oxygen and water have been removed, the mixture is heated to a second temperature, which is higher than the first temperature, to allow the components of the mixture to react. The heating at the second temperature may also be done under an inert gas flow, such as argon. In one embodiment, the second temperature is from 450 to 750° C. In another embodiment, the second temperature is from 500 to 700° C. In another embodiment, the second temperature is from 550 to 650° C. In another embodiment, the second temperature is from 575 to 625° C. In another embodiment, the second temperature is about 600° C. In one embodiment, the mixture is held at the second temperature for 1 hour to 30 hours. In another embodiment, the mixture is held at the second temperature for 5 hours to 25 hours. In another embodiment, the mixture is held at the second temperature for 10 hours to 25 hours. In another embodiment, the mixture is held at the second temperature for about 20 hours. Following the heating at the second temperature, the reacted active material may be allowed to cool to room temperature. The cooling may be done while still under an inert gas flow.

Synthesis using acetates and/or acetate hydrates may yield high phase purity for Zn, Mn, and Mg, for example, at least 90% by weight $MSb_2O_4$. As used herein, "purity" is the weight percent of the synthesis products that have the $MSb_2O_4$ structure. Impurities, or products not having the $MSb_2O_4$ structure, may vary depending on the reactants and may include metal alloys such as MSb and/or $MSb_2$. In one embodiment, synthesis with M=Zn using the acetate/acetate hydrate method may have a phase purity of at least 90% by weight $ZnSb_2O_4$. In another embodiment, synthesis with M=Zn using the acetate/acetate hydrate method may have a phase purity of at least 92% by weight $ZnSb_2O_4$. In one embodiment, synthesis with M=Mn using the acetate/acetate hydrate method may have a phase purity of at least 90% by weight $MnSb_2O_4$. In another embodiment, synthesis with M=Mn using the acetate/acetate hydrate method may have a phase purity of at least 92% by weight $MnSb_2O_4$. In one embodiment, synthesis with M=Mg using the acetate/acetate hydrate method may have a phase purity of at least 90% by weight $MgSb_2O_4$. In another embodiment, synthesis with M=Mg using the acetate/acetate hydrate method may have a phase purity of at least 92% by weight $MgSb_2O_4$.

Synthesis with M=Fe using acetates and/or acetate hydrates may yield phase purity of, for example, at least 75% by weight $FeSb_2O_4$. In another embodiment, synthesis with M=Fe using the acetate/acetate hydrate method may have a phase purity of at least 80% by weight $FeSb_2O_4$. In another embodiment, synthesis with M=Fe using the acetate/acetate hydrate method may have a phase purity of at least 82% by weight $FeSb_2O_4$.

In at least a second embodiment embodiment, the $MSb_2O_4$ anode active material is synthesized by mixing stoichiometric ratios of a metal oxide of Zn, Fe, Mn, Mg, Ni, or Co (e.g., ZnO) and an antimony oxide and heating the mixture in an atmosphere of an inert gas, for example, argon. In one embodiment, the antimony oxide is $Sb_2O_3$. The metal oxide and the antimony oxide may be in the form of a powder, and may be mixed in any suitable manner, such as ball milling. The powder may be pressed into a pellet to increase contact between the components in the mixture. The mixture may be heated at a first, lower temperature to remove oxygen and water from the powder mixture. In one embodiment, the first temperature is from 80 to 200° C. In another embodiment, the first temperature is from 100 to 175° C. In another embodiment, the first temperature is about 150° C. However, any suitable temperature for removing oxygen and water from the mixture may be used. The mixture may be held at the first temperature for a time sufficient to remove substantially all oxygen and water from the mixture. In one embodiment, the mixture is held at the first temperature for 10 minutes to 2 hours. In another embodiment, the mixture is held at the first temperature for 30 minutes to 1.5 hours. In another embodiment, the mixture is held at the first temperature for about 1 hour. The heating at the first temperature may be done under an inert gas flow, for example, argon.

After substantially all of the oxygen and water have been removed, the mixture is heated to a second temperature, which is higher than the first temperature, to allow the components of the mixture to react. The heating at the second temperature may also be done under an inert gas flow, such as argon. In one embodiment, the second temperature is from 400 to 750° C. In another embodiment, the second temperature is from 450 to 650° C. In another embodiment, the second temperature is from 500 to 625° C. In another embodiment, the second temperature is from 525 to 575° C. In another embodiment, the second temperature is about 550° C. In one embodiment, the mixture is held at the second temperature for 1 hour to 30 hours. In another embodiment, the mixture is held at the second temperature for 5 hours to 25 hours. In another embodiment, the mixture is held at the second temperature for 10 hours to 25 hours. In another embodiment, the mixture is held at the second temperature for about 20 hours. Following the heating at the second temperature, the reacted active material may be allowed to cool to room temperature. The cooling may be done while still under an inert gas flow.

Synthesis using metal oxides may yield higher phase purity than synthesis using metal acetates and/or acetate hydrates. For M=Zn, Mn, Mg, Fe, Ni, or Co, for example, the phase purity may be at least 95% by weight $MSb_2O_4$. In one embodiment, synthesis with M=Zn using the metal oxide method may have a phase purity of at least 97% by weight $ZnSb_2O_4$. In one embodiment, synthesis with M=Mg using the acetate/acetate hydrate method may have a phase purity of at least 97% by weight $MgSb_2O_4$. In another embodiment, synthesis with M=Mg using the metal oxide method may have a phase purity of at least 99% by weight $MgSb_2O_4$. In one embodiment, synthesis with M=Co using the acetate/acetate hydrate method may have a phase purity of at least 97% by weight $CoSb_2O_4$. In another embodiment, synthesis with M=Co using the metal oxide method may have a phase purity of at least 99% by weight $CoSb_2O_4$.

Not all transition metals and alkali-earth metals may be successfully synthesized into a $MSb_2O_4$ structure. For example, attempts to synthesize the $MSb_2O_4$ structure using another transition metal, copper (Cu), resulted in a two-phase mixture of about 20% by weight $Cu_2Sb$ and about 80% by weight $Cu_3Sb$. Attempts to synthesize the $MSb_2O_4$ structure using another alkali-earth metal, calcium (Ca), also failed. Accordingly, not all metals able to take a 2+ oxidation state may be successfully synthesized into the $MSb_2O_4$ structure.

The discharge voltage of the anode active material having the $MSb_2O_4$ structure (M=Zn, Fe, Mn, Mg, Ni, or Co) may be from 0.1 to 1.0 V. In one embodiment, the discharge voltage may be from 0.2 to 0.9 V. In another embodiment, the discharge voltage may be from 0.3 to 0.8 V. In another embodiment, the discharge voltage may be from 0.4 to 0.8 V. In another embodiment, the discharge voltage may be from 0.5 to 0.8 V. In another embodiment, the discharge voltage may be from 0.5 to 0.7 V. In another embodiment, the discharge voltage may be around 0.6 V. The discharge voltage may be greater than that for graphitic carbon anodes (around 0.02 V) but not so high that a significant loss of power density occurs, such as in titanate anodes (around 1.5 V). The anodes having the $MSb_2O_4$ structure (M=Zn, Fe, Mn, Mg, Ni, or Co) may therefore avoid high rates of lithium plating and SEI formation and still maintain sufficient power density.

The anode active material having the $MSb_2O_4$ structure (M=Zn, Fe, Mn, Mg, Ni, or Co) may have a reversible capacity of at least 250 mAh/g. In one embodiment, the reversible capacity may be at least 300 mAh/g. In another embodiment, the reversible capacity may be at least 400 mAh/g. In another embodiment, the reversible capacity may be at least 500 mAh/g. In another embodiment, the reversible capacity may be at least 600 mAh/g. In one embodiment, the reversible capacity may be from 200 to 600 mAh/g. In another embodiment, the reversible capacity is from 250 to 550 mAh/g. In another embodiment, the reversible capacity is from 300 to 500 mAh/g.

EXAMPLES

Figure 3:
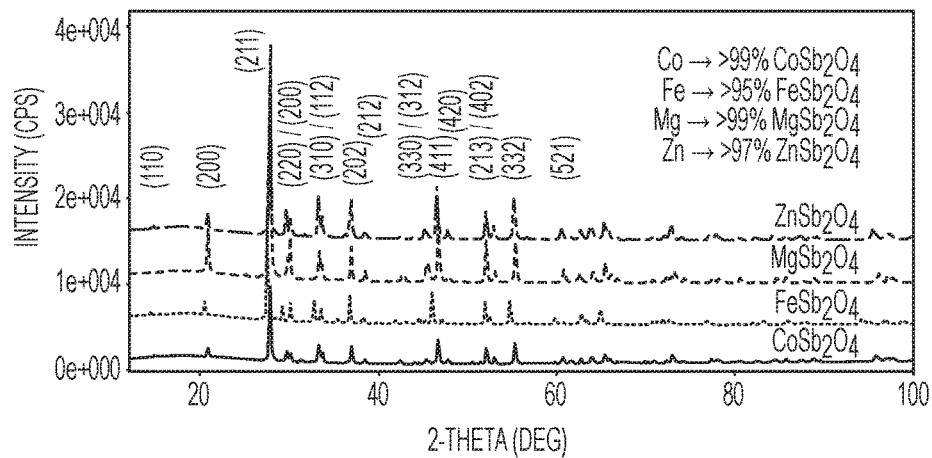
FIG. 3 is X-ray Diffraction (XRD) data showing the formation of a $MSb_2O_4$ structure from metal oxide synthesis of cobalt, iron, magnesium, and zinc.
Figure 4:
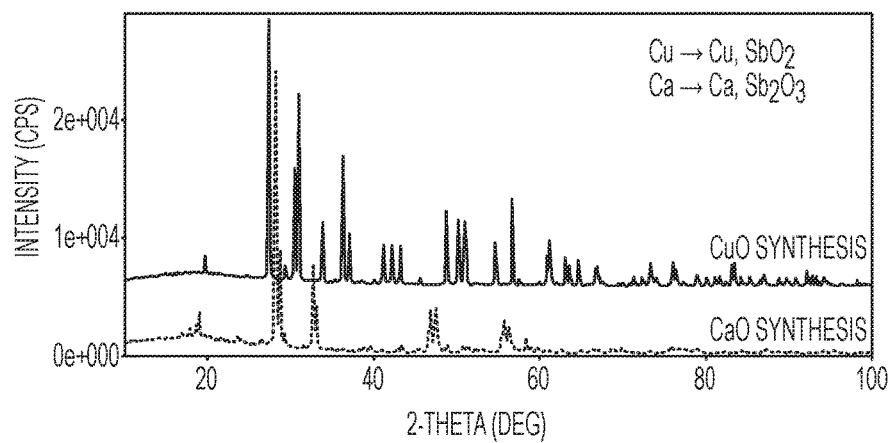
FIG. 4 is XRD data showing non-formation of a $MSb_2O_4$ structure from metal oxide synthesis of copper and calcium.

Stoichiometric ratios of metal oxides of Ca, Mn, Mg, Fe, Co, Cu, Ni, and Zn were mixed with $Sb_2O_3$. Two grams of each mixture were placed in an alumina boat and heated in a tube furnace at 150° C. for one hour under argon flow to remove all residual oxygen and water in the powder. Each sample was then heated to 550° C. for 20 hours and then allowed to cool to room temperature, all while still under argon flow. The samples were characterized using X-ray diffraction (XRD) to determine if the $MgSb_2O_4$ structure was formed. Of the samples tested, Zn, Mn, Fe, Mg, Ni, and Co resulted in the $MgSb_2O_4$ structure, while Cu and Ca did not. The samples that did form the $MgSb_2O_4$ structure also had very high purities, as shown in FIG. 3. The Fe sample had a purity by weight of 95%, the Zn sample had a purity by weight of 97% and the Co and Mg samples had a purity by weight of 99%. The XRD results of Cu and Ca are shown in FIG. 4, which indicates that the $MgSb_2O_4$ structure is not present.

Stoichiometric ratios of Mn, Mg, Fe, Cu, Zn, and Co of metal acetates and/or acetate hydrates were mixed with $Sb_2O_3$. Two grams of each mixture were placed in an alumina boat and heated in a tube furnace at 150° C. for one hour under argon flow to remove all residual oxygen and water in the powder. Each sample was then heated to 600° C. for 20 hours and then allowed to cool to room temperature, all while still under argon flow. XRD characterization showed that the Zn, Mn, Mg, Fe, and Co samples all resulted in the $MgSb_2O_4$ structure, while Cu did not. The Co sample had a purity by weight of 93% (about 7 wt % CoSb impurity). The Fe sample had a purity by weight of 82% (about 18 wt % of an unidentified impurity).

Figures 5, 6:
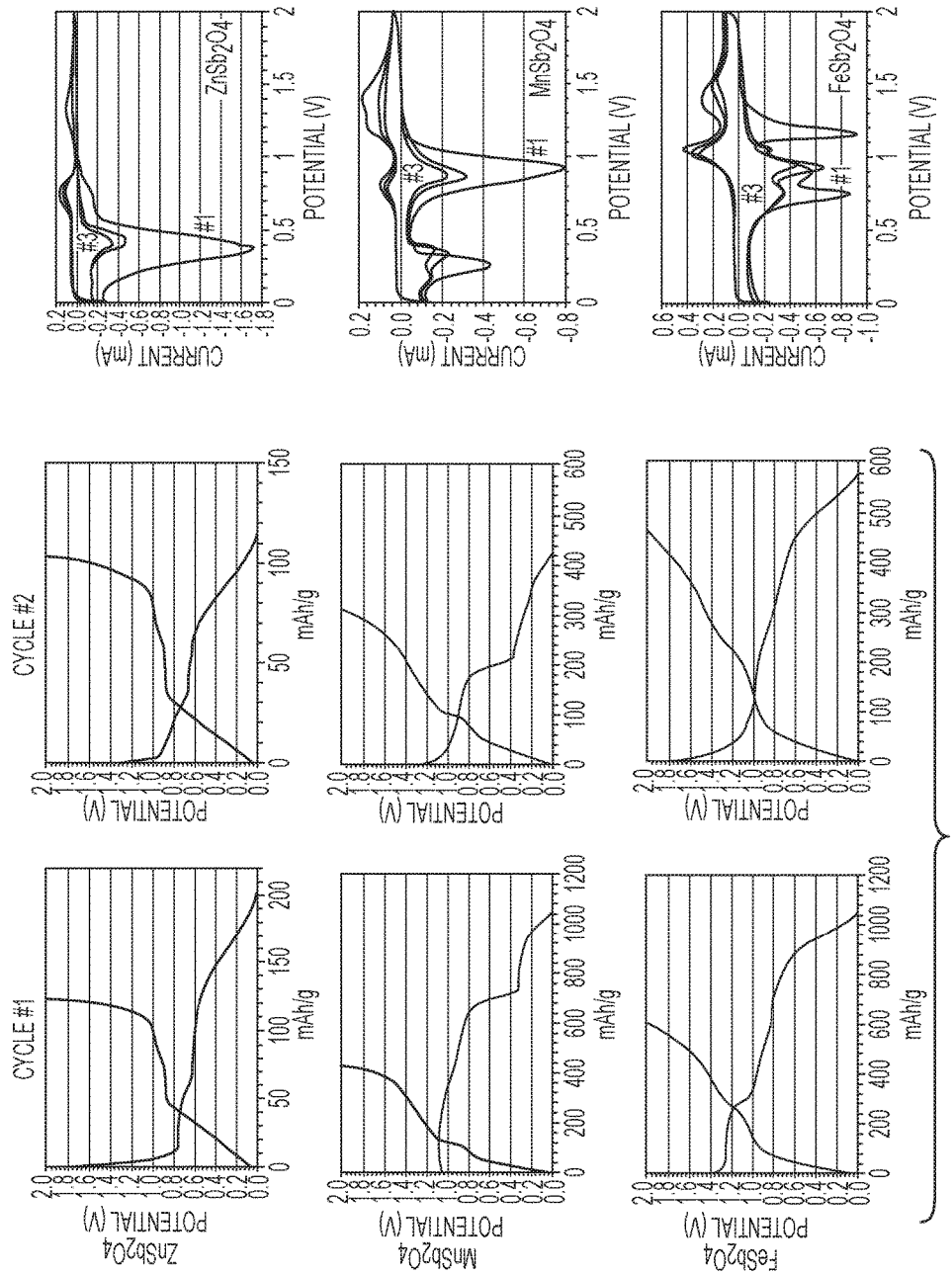
FIG. 5 is the first two cycles of galvanostatic cycling data for several anode active materials formed by metal oxide synthesis.
FIG. 6 is three cycles of cyclic voltammetry data for several anode active materials formed by metal oxide synthesis.

Galvanostatic cycling of the Zn, Mn, and Fe products of the metal oxide synthesis was performed at a rate of C/5 between 0.05 and 2.0 V. The first two cycles for each metal product are shown in FIG. 5, which indicates that the lithium can be reversibly cycled from each material and that they can be used as active lithium storage materials in LIBs. As shown in FIG. 5, the initial lithiation capacities for Zn, Mn, and Fe were about 200, 1,040, and 1,040 mAh/g, respectively. The initial delithiation capacities were about 120, 440, and 600 mAh/g, respectively. Cyclic voltammetry was also performed on the Zn, Mn, and Fe products tested in FIG. 5. The test was conducted between 0.01 and 2.0 V for three cycles and at a scan rate of 2 mV/s. The results are shown in FIG. 6, which further confirms the electrochemical activity of the materials towards reaction with lithium.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of forming an anode active material comprising:
    mixing a metal oxide of the formula MO with antimony oxide, where M is one of Zn, Mn, or Mg and has an oxidation state of 2+;
    heating the mixture to a first temperature to remove oxygen and water from the mixture; and
    reacting the mixture at a second temperature to form $MSb_2O_4$.

2. The method of claim 1, wherein the first temperature is from 80° C. to 200° C.

3. The method of claim 1, wherein the mixture is reacted to form $MSb_2O_4$ with a purity of at least 95 percent by weight.

4. The method of claim 1, wherein the second temperature is from 450° C. to 650° C.

5. The method of claim 1, wherein the mixture is held at the second temperature for 5 to 25 hours.

6. The method of claim 1, wherein the mixing includes ball milling stoichiometric ratios of the MO and antimony oxide to form an intermixed powder.

7. The method of claim 1, wherein the heating and reacting are done in an argon gas atmosphere.

8. The method of claim 1, wherein the mixture is held at the first temperature for 10 minutes to 2 hours.

9. The method of claim 1, wherein the mixing further includes mixing a metal oxide of the formula M2O, where M2 is different from M and has an oxidation state of 2+, and the reacting forms $M_xM2_ySb_2O_4$ with x and y summing to 1.

10. The method of claim 9, wherein the mixing further includes mixing a metal oxide of the formula M3O, where M3 is different from M and M2 and has an oxidation state of 2+, and the reacting forms $M_xM2_yM3_zSb_2O_4$ with x, y, and z summing to 1.

11. The method of claim 1, wherein the antimony oxide includes $Sb_2O_3$.

12. The method of claim 1, wherein the second temperature is from 525° C. to 575° C.

13. A method of forming an anode active material comprising:
    mixing a metal (M) acetate or acetate hydrate with an antimony oxide, where M has an oxidation state of 2+ and is one of Zn, Fe, Mg, or Mn;
    heating the mixture to a first temperature to remove oxygen and water from the mixture; and
    reacting the mixture at a second temperature to form $MSb_2O_4$.

14. The method of claim 13, wherein the mixing includes ball milling stoichiometric ratios of the M acetate or acetate hydrate and antimony oxide to form an intermixed powder.

15. The method of claim 13, further comprising forming an anode with the $MSb_2O_4$ as an active material.

16. The method of claim 13, wherein the second temperature is from 450° C. to 750° C. and the mixture is held at the second temperature for a period of 5 to 25 hours.

17. The method of claim 13, wherein the mixing further includes mixing a metal (M2) acetate or acetate hydrate, where M2 is different from M and has an oxidation state of 2+, and the reacting forms $M_xM2_ySb_2O_4$ with x and y summing to 1.

18. The method of claim 17, wherein the mixing further includes mixing a metal (M3) acetate or acetate hydrate, where M3 is different from M and M2 and has an oxidation state of 2+, and the reacting forms $M_xM2_yM3_zSb_2O_4$ with x, y, and z summing to 1.

19. The method of claim 13, wherein the second temperature is from 575° C. to 625° C.

* * * * *